United States Patent [19]

Sawyer

[11] 4,087,663
[45] May 2, 1978

[54] LIQUID LEVEL CONTENTS INDICATORS FOR VEHICLE HYDRAULIC SYSTEMS

[75] Inventor: Patrick Frank Sawyer, Walsall, England

[73] Assignee: Girling Limited, Birmingham, England

[21] Appl. No.: 726,118

[22] Filed: Sep. 24, 1976

[30] Foreign Application Priority Data

Oct. 28, 1975 United Kingdom .............. 44229/75

[51] Int. Cl.² ............................................ H01H 35/18
[52] U.S. Cl. ................................ 200/84 R; 200/302; 200/61.2; 73/308; 200/159 B; 340/244 R
[58] Field of Search ............ 340/244 R, 244 A, 244 E; 73/308, 319; 200/61.2, 83 Z, 84 R, 84 B, 81 R, 81.5, 330, 302, 159 B, 160

[56] References Cited

U.S. PATENT DOCUMENTS

| | | | |
|---|---|---|---|
| 2,681,959 | 6/1954 | Lanyon | 200/84 R |
| 3,296,396 | 1/1967 | Stiward | 200/84 R |
| 3,531,767 | 9/1970 | Klein | 73/308 |
| 3,584,162 | 6/1971 | Krakimowski | 200/159 B |
| 3,603,756 | 9/1971 | Carpentier | 200/159 B |
| 3,673,587 | 6/1972 | Baruch | 200/84 R |

*Primary Examiner*—Gerald P. Tolin
*Attorney, Agent, or Firm*—Scrivener, Parker, Scrivener and Clarke

[57] ABSTRACT

In a liquid level contents indicator for a vehicle hydraulic system of the float-operated electric switch type manually operable mechanism for testing the circuit comprises a push-button located in an end closure cap for a reservoir and the push-button acts on contacts of the electric circuit through a resilient diaphragm which also acts as a return spring for the push-button and provides a seal between the push button and the cap.

4 Claims, 3 Drawing Figures

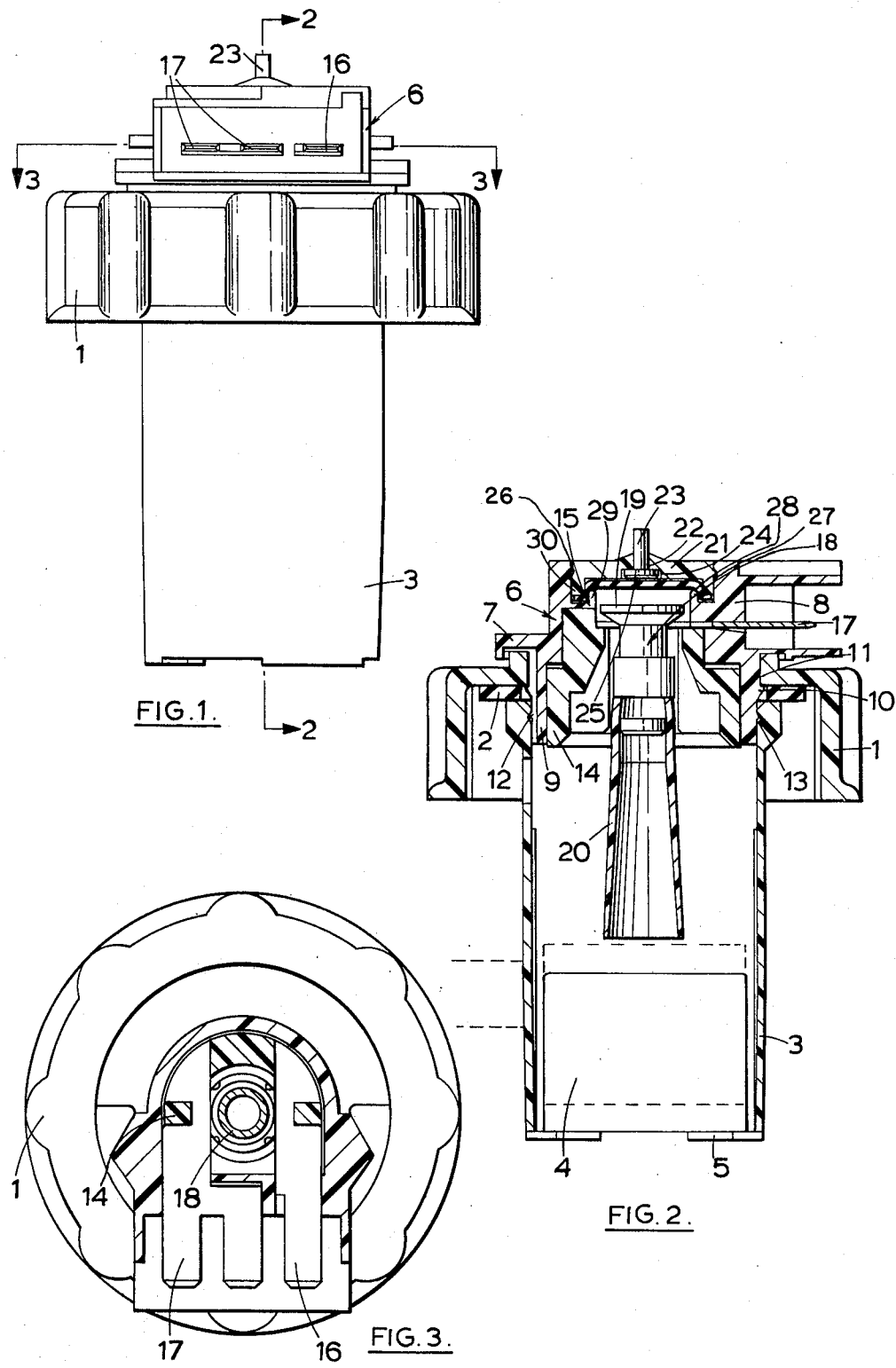

LIQUID LEVEL CONTENTS INDICATORS FOR VEHICLE HYDRAULIC SYSTEMS

This invention relates to improvements in liquid level contents indicators for vehicle hydraulic systems of the kind comprising a float-operated electric switch operative to complete an electrical circuit when the level of liquid in a reservoir for hydraulic fluid is below a predetermined value, indicating means energised by the circuit, and manually-operable means for operating the switch manually to test the circuit.

In known contents indicators of the kind set forth the manually-operable means comprises a push-button located in an end closure cap for the reservoir and which is depressed to make the contacts of the switch, and a spring is incorporated in the cap normally to bias the push-button away from the contacts so that an additional space is required to accommodate the spring with inherent increase in the height of the indicator. Also since hydraulic fluid is hygroscopic such known contents indicators embody elaborate sealing means, particularly in the region of the push-button, to prevent the fluid from being contaminated by moisture.

In another known contents indicator of the kind set forth the push-button is resilient so as to act as a return spring itself. This construction has the disadvantage that the resilient button is susceptible to oil degradation and excessive wear and when the button is constructed from natural rubber, it may be liable to perish as it is open to the engine compartment environment.

According to our invention in a liquid level contents indicator of the kind set forth for a vehicle hydraulic system the manually-operable means comprises a push-button located in an end closure cap for the reservoir and the push-button acts on the contacts through a resilient diaphragm which acts as a return spring for the push-button and provides a seal between the push-button and the cap.

The provision of a single component which will perform the function previously performed by separate components has the advantage that the construction is simplified and the height of the closure cap is reduced.

The resilient diaphragm in our construction is protected from excessive wear and degradation by its positioning within the cap.

An embodiment of our invention will now be described by way of example with reference to the accompanying drawings, in which:

FIG. 1 is a side elevation of a liquid contents indicator for the reservoir of a vehicle hydraulic braking system, FIG. 2 is a section on the line 2—2 of FIG. 1; and FIG. 3 is a section on the line 3—3 of FIG. 1.

The liquid contents indicator illustrated in the drawings comprises an internally screw-threaded end cap 1 for screw-threaded engagement with a complementary screw-thread surrounding a filler opening at the upper end of a reservoir for hydraulic fluid of a vehicle hydraulic system, for example a reservoir for supplying fluid to a pedal-operated master cylinder of a brake or clutch system. An annular seal 2 for engagement with the upper end of the reservoir is located in the cap 1 and is clamped in position by the upper end of a generally cylindrical housing part 3 which accommodates a float 4. The housing part 3 is open at 5 and its lower end so that the float is exposed to fluid when the housing 3 is inserted into the reservoir through the filler opening.

A second housing part 6 has a radial flange 7 for engagement with the outer end of the cap 1, an upstanding cylindrical body part 8, and a depending cylindrical skirt 9 which projects into the upper end of the housing part 3. The skirt 9 is provided with an outwardly directed upper radial rib 10 which has a push-in and snap engagement with a face at the inner end of an opening 11 in the cap 1, and an outwardly directed lower radial rib 12 which has a push-in and snap engagement in a complementary recess 13 in the housing part 3 to maintain that part in position.

A cylindrical liner or sleeve 14 of stepped outline is housed within a complementary stepped bore defined by the interior of the skirt 9 and a portion of the body part 8 which terminates at a radial flange 15 against which the upper end of the liner or sleeve 14 abuts.

Spaced contacts 16 and 17 embedded in the walls of the housing part 6 and the liner or sleeve 14 traverse the bore in the liner or sleeve 14. A metal switch member 18 located between the contacts 16 and 17 at their inner ends has an enlarged head 19 which is engageable with both contacts to complete an electrical circuit to energise indicating means, conveniently a lamp installed in the dashboard of a vehicle. The switch member 18 carries a depending stem 20 with which the float 4 is engageable to hold the head 19 out of engagement with the contacts 16 and 17 when the level of fluid in the reservoir is above a predetermined minimum value so that the indicating means is inoperative.

As the float is separate from the stem there will be minimal side-loading of the stem and consequently there is substantially no risk of it binding in the guide sleeve 14.

The upper end of the body part 8 is closed by a plug 21 having a central bore 22 through which projects a push-button 23. The bore 22 is counterbored at its inner end at 24 to receive a head 25 at the inner end of the button 23. The plug 21 is held in position by a push-in and snap engagement between a rib 26 on the plug 21 and an annular groove 27 in the body part 8.

A flexible resilient diaphragm 28 clamped at its peripheral edge between 21 and the radial flange 15 acts as a seal between these parts and normally acts on the head 25 as a return spring to hold the push button 23 in the retracted inoperative position shown in the drawings in which it is spaced from the switch member 18. Conveniently the inner end of the flange 15 has an outwardly directed axial extension 29 and the plug 21 has an inwardly directed skirt 30 spaced radially from the extension 29 but overlapping same so that the peripheral edge of the diaphragm 28 is distended and imprisoned therebetween to enhance the sealing effect.

When it is desired to test the electrical circuit the push-button 23 is manually depressed into an operative position to urge the switch member 18 into engagement with the contacts 16 and 17 with the diaphragm 28 deflecting resiliently. Upon release of the manually applied force the pushbutton 23 is returned to its inoperative position by the resilience of the material diaphragm.

I claim:

1. A liquid level contents indicator for a vehicle hydraulic system comprising spaced contacts of an electric circuit, an electric switch member operative to engage with both contacts and complete the electric circuit, indicating means energised by said electric circuit, means operating said switch member such that the electric circuit is completed when the level of liquid in a reservoir for hydraulic fluid in said system is below a predetermined value, an end closure cap for said reservoir, said closure cap including a hollow housing and a plug closing one end of said housing, a manually operable push button located in said plug for testing said circuit, and a resilient diaphragm clamped at its peripheral edge between said plug and said housing, said diaphragm comprising means acting as a return spring for said button and providing a seal between said plug and said housing.

2. A liquid level contents indicator as claimed in claim 1, wherein a float is accommodated in said housing, said plug has a central bore through which said push-button projects and a radial flange is provided in said housing adjacent to an inner end of said push-button, said resilient diaphragm being clamped at its peripheral edge between said plug and said flange.

3. A liquid level contents indicator as claimed in claim 2, wherein said flange has an outwardly directed axial extension and said plug has an inwardly directed skirt spaced radially from said extension but overlapping it so that the peripheral edge of said diaphragm is distended and imprisoned therebetween.

4. A liquid level contents indicator as claimed in claim 1, wherein said housing comprises first and second housing parts and said second housing part comprises an upstanding cylindrical body extending out of said first part and a downwardly depending skirt projecting into said first part, said plug and said resilient diaphragm being located in said cylindrical body, and a sleeve housed within said skirt and cylindrical body abuts against said flange, and wherein said contacts of the electrical circuit are embedded in said sleeve and the walls of said body, and said metal switch member has a downwardly depending stem and is engageable with both contacts, said float being engageable with the lower end of said stem so as to hold said switch out of engagement with said contacts when the fluid level in said reservoir is above a predetermined minimum level.

* * * * *